FUNCTION GENERATING APPARATUS

Filed May 31, 1966

INVENTORS.
PAUL M. METTERT
WILLIAM E. CURRIE
BY Bruce C. Lutz
ATTORNEY

United States Patent Office 3,465,257

Patented Sept. 2, 1969

3,465,257
FUNCTION GENERATING APPARATUS

William E. Currie and Paul M. Mettert, Seattle, Wash., assignors to Honeywell Inc., Minneapolis, Minn., a corporation of Delaware Filed May 31, 1966, Ser. No. 553,921
Int. Cl. H03k *6/00*
U.S. Cl. 328—185 2 Claims

ABSTRACT OF THE DISCLOSURE

A sawtooth waveform generator capable of providing a sawtooth waveform output which is a sub-multiple of a basic frequency pulse input.

This invention pertains generally to electronic circutry and more particularly to an electronic circuit which provides a sawtooth waveform output which is a submultiple of a basic frequency pulse input.

While controlled rectifier circuits have been used in the prior art to accomplish frequency dividing, the operation often has become marginal and erratic due to variations in bias level, trigger level, and tube aging. The present circuit, using feedback from the output whereby the output sawtooth waveform is combined with pulsating input signals, overcomes the above mentioned problems and produces a stable unit which once calibrated does not need to be recalibrated for a considerable period of time.

Figure 2:
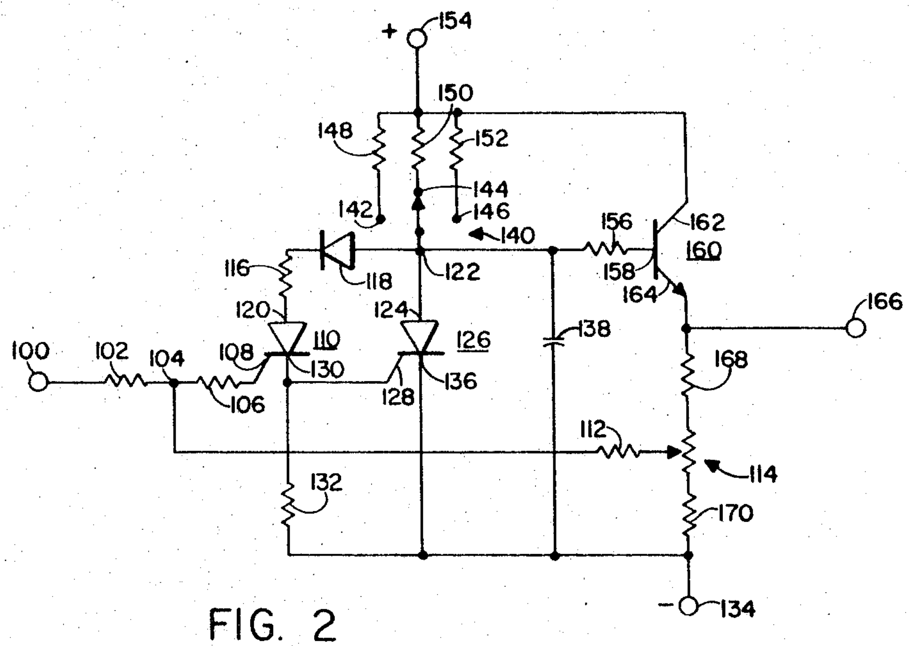
Figure 1:
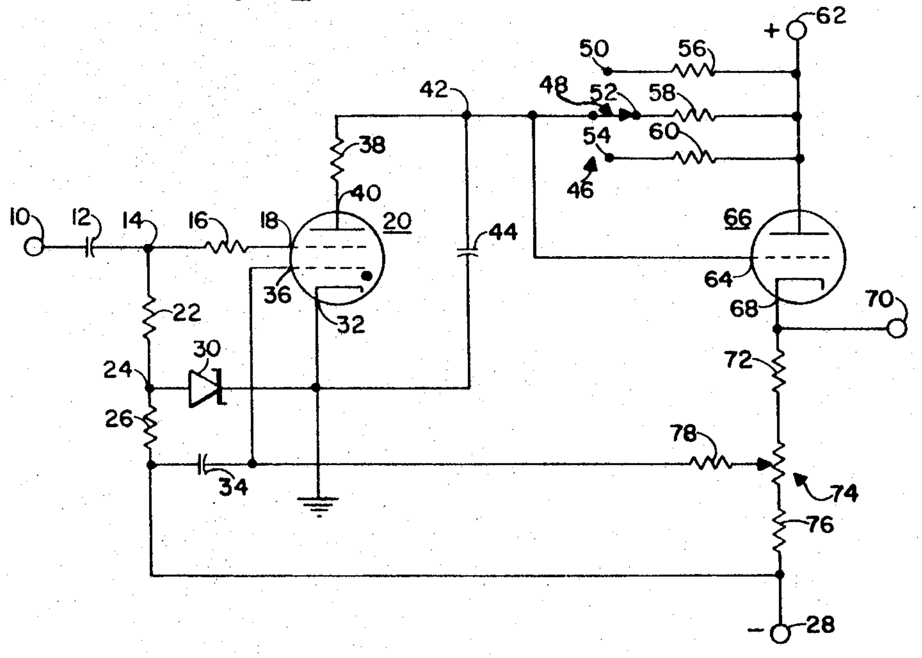

Various objects and advantages of the present invention will become apparent from a reading of the specification and claims in conjunction with the figures wherein FIGURE 1 is a circuit diagram of a thyratron tube controlled rectifier dividing circuit; and FIGURE 2 is a circuit diagram of a solid state silicon controlled rectifier dividing circuit.

Referring first to FIGURE 1, it will be noted that an input signal supply terminal means 10 is connected to one lead of a capacitor 12 which has the other lead thereof connected to a junction point 14. A resistance element 16 is connected between junction point 14 and an input control grid means 18 of a thyratron tube, controlled switch or controlled rectifying means generally designated as 20. A resistance element 22 is connected between junction point 14 and a junction point 24. The resistance element 26 is connected between junction point 24 and a negative power terminal means 28. A Zener diode 30 is connected between junction point 24 and a cathode or output means 32 of tube 20 such that Zenering action holds the cathode 32 positive with respect to junction point 24. A capacitor 34 is connected between terminal 28 and a second control grid 36 of tube 20. A resistance element 38 is connected between a plate or output means 40 of tube 20 and a junction point 42. A charging capacitor or reactive means 44 is connected between junction point 42 and cathode 32. A variable position switch or selection means generally designated as 46 has a variable position wiper 48 connected to junction point 42 and has three output terminals designated as 50, 52, and 54. Three resistance elements designated respectively as 56, 58, and 60 are connected between the last three mentioned terminals of switch 46 and commonly connected to a positive power terminal 62. Junction point 42 is also connected to a control grid 64 of a tube generally designated as 66. An anode of tube 66 is connected to terminal 62 while a cathode 68 of tube 66 is connected to an output terminal 70 of the apparatus. A resistance element 72 is connected in series with a resistance element of a potentiometer generally designated as 74 and a resistance element 76 between cathode 68 and terminal 28. A resistance element 78 is connected between the control grid 36 of tube 20 and a wiper of potentiometer 74.

Referring now to FIGURE 2, it will be noted that an input signal supply terminal means 100 is connected to one end of a resistance element 102 which is connected on the other end to a junction point 104. A resistance element 106 is connected between junction point 104 and an input control element means or gate 108 of a controlled rectifier, controlled switch or SCR (silicon controlled rectifier) generally designated as 110. A resistance element 112 is connected between junction point 104 and a wiper of a potentiometer generally designated as 114. A resistance element 116 is connected in series with a diode 118 between an anode or output means 120 of SCR 110 and a junction point 122 so that the direction of easy current flow is toward SCR 110. Junction point 122 is also connected to an anode or output means 124 of a second controller rectifier means, controlled switch or SCR generally designated as 126. A gate or input control means 128 of SCR 126 is connected to a cathode or output means 130 of SCR 110. A resistance element 132 is connected between cathode 130 and a negative power terminal means 134. Terminal 134 is also connected to a cathode or output means 136 of SCR 126. A capacitive element or reactive means 138 is connected between anode 124 and cathode 136. A switch or selection means generally designated as 140 has a wiper connected to junction joint 122 and has three output terminals designated as 142, 144, and 146. Three resistance elements 148, 150, and 152 are connected between the respective terminals 142, 144, and 146 and a common terminal 154. Terminal 154 is also the point at which positive power is supplied to the circuit. A resistance element 156 is connected between junction point 122 and a base 158 of a transistor generally designated as 160 having a collector 162 and an emitter 164. Collector 162 is connected to terminal 154 while emitter 164 is connected to an output terminal 166 for a dividing circuit. A resistance element 168 is connected in series with the resistance element of potentiometer 114 and further in series with a resistance element 170 between output terminal 166 and negative power terminal 134.

As will be realized by those skilled in the art, a thyratron such as shown in FIGURE 1 must have a certain combination of voltages applied to the control grids and across the tube before it will fire. There are many combinations of voltages which will allow the tube to fire. As the voltage between anode and cathode becomes greater across the tube, less positive voltages are necessary at the control grids in order to fire the tube. In fact, if the voltage across anode to cathode becomes great enough, the tube will fire even with negative voltages applied to both of the control grids. In operation, there is a negative voltage applied to control grid 36 from terminal 28. This negative voltage acts to keep the thyratron 20 in an off condition. However, the capacitor 44 will be charging through one of the resistors 56–60 and the voltage between the anode 40 and cathode 32 will gradually increase. At some point, the combination of the voltage at grid 36 and the pulse input from terminal 10 will act to increase these two voltages enough so that the tube 20 will conduct. At this point, the capacitor 44 will become completely discharged and when the current through tube 20 is reduced to a low enough value, the tube will turn OFF and capacitor 44 will again start to charge. Thus, a sawtooth waveform is produced at junction point 42. This is applied to a cathode follower tube circuit to provide a sawtooth waveform at junction point 70. The cathode follower 66 is utilized in one embodiment of this circuit to provide a low impedance output and is not a necessary part of the invention. However, when the cathode follower is used, the impedance of various portions of the circuit are more closely related and the circuit is more stable.

FIGURE 2 utilizes a low current SCR 110 to take the combination of the input pulses applied to terminal 100 and the feedback waveform in the form of a sawtooth obtained from potentiometer 114. When the combination of the sawtooth and the pulsating input becomes great enough to activate SCR 110, activation of the power SCR 126 will occur. When SCR 126 is activated, capacitor 138 is discharged and the action of the circuit is much the same as that described in conjunction with FIGURE 1. The transistor 160 comprises a cathode follower type circuit although when transistors are used it is commonly called an emitter follower. Since the SCR 110 is a low current device, it provides a high input impedance. The diode 118 prevents transistor action in SCR 110 if a positive input voltage should coincide with negative anode potential. As will be realized, if a high input impedance SCR also had a high current capability, only one SCR would be necessary and the circuit would be more like the thyratron circuit of FIGURE 1.

In both circuits, a potentiometer is used to adjust the feedback voltage. Since the output voltage is the signal that is being fed back and since the amount of this feedback signal is being adjusted, there is only one adjustment to make even though several different frequency dividing settings are desired. The only criterion is that the selected resistors such as resistors 148–152 be the desired multiples of one another.

In one working embodiment, the input frequency was six cycles per second while the resistors 56–60 were respectively 1.5 megohms, 3 megohms, and 6 megohms with the resulting output frequencies six cycles per second, three cycles per second, and 1.5 cycles per second.

While two embodiments have been shown and described in the specification, it is to be realized that other embodiments are within the scope of the invention.

We claim:

1. Sawtooth generating apparatus comprising, in combination:
   - power supplying means including first and second power terminals and intermediate reference terminal means;
   - four element controlled thyratron including anode, cathode, and first and second control grids;
   - variable impedance means connected between said first power terminal means and said anode;
   - input pulse supplying means connected to said first grid;
   - means connecting said cathode to said reference potential;
   - biasing means connected to said first grid for biasing said first grid at a potential negative with respect to said cathode;

- capacitive means connected between said anode and said cathode, said capacitive means charging when said controlled thyratron is OFF;
   - cathode follower means including an input connected to said anode and an output for supplying sawtooth signals which are equal to or a submultiple of said input pulses; and
   - feedback means connected from said output means to said second grid for supplying feedback signals thereto.

2. Sawtooth generating apparatus comprising, in combination:
   - power supplying means including first and second power terminals;
   - first and second solid state controlled rectifier means each including anode, cathode, control means;
   - variable impedance means connected between said first power terminals means and said anode means;
   - input pulse supplying means connected to said control means of said first rectifier means;
   - means connecting said cathode means of said second rectifier means to said second power terminal;
   - means connecting said cathode of said first rectifier means to said control means of said second rectifier means;
   - capactive means connected between said anode and said cathode of said second rectifier means, said capacitive charging when said second controlled rectifier is OFF;
   - emitter follower means including an input connected to said anode of said second rectifier means and an output for supplying sawtooth signals which are equal to or a submultiple of said input pulses; and
   - feedback means connected from said output means to said control means of said first rectifier means for supplying feedback signals thereto.

References Cited

UNITED STATES PATENTS

| | | | |
|---|---|---|---|
| 2,144,779 | 1/1939 | Schlesinger | 328—66 XR |
| 2,476,997 | 7/1949 | Noyes | 328—210 XR |
| 2,883,535 | 4/1959 | Creveling et al. | 328—210 |
| 2,962,663 | 11/1960 | Hileman | 328—39 |
| 2,996,679 | 8/1961 | Byerly | 328—185 XR |
| 3,015,784 | 1/1962 | Cirone | 307—228 XR |
| 3,031,621 | 4/1962 | Schreiner | 307—228 XR |
| 3,181,070 | 4/1965 | Robuck | 307—225 XR |
| 3,221,184 | 11/1965 | Hickey | 328—67 XR |
| 3,293,449 | 12/1966 | Gutzwiller | 307—252 |

JOHN S. HEYMAN, Primary Examiner

STANLEY T. KRAWCZEWICZ, Assistant Examiner

U.S. Cl. X.R.

328—35, 41, 66, 67, 210; 307—225, 228, 252, 284